Patented Dec. 27, 1938

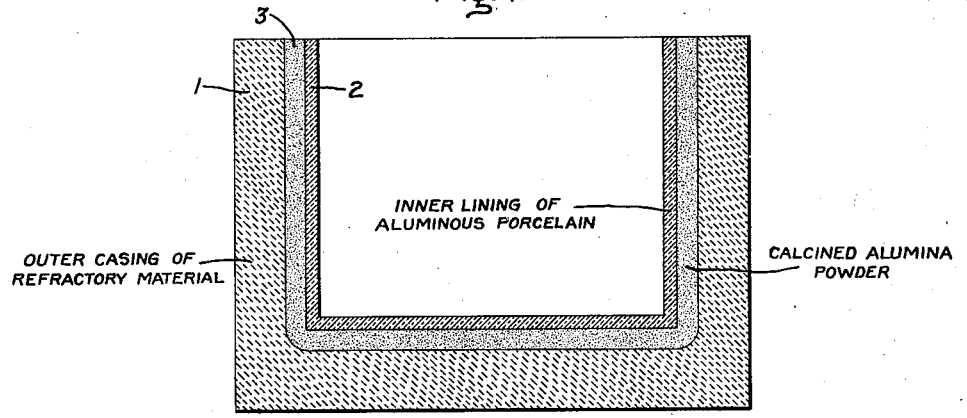
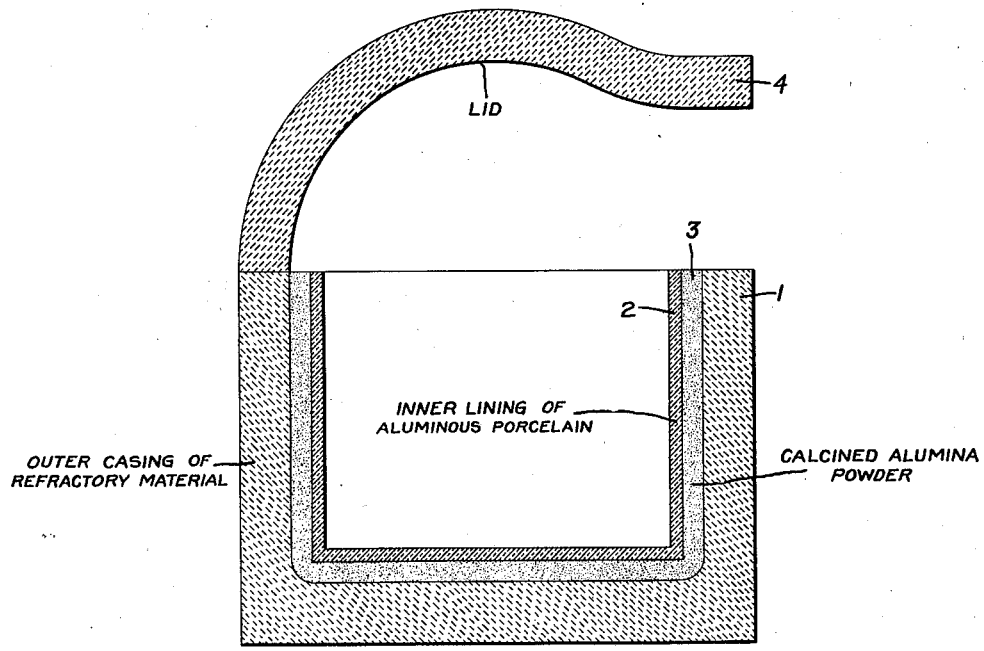

2,141,930

UNITED STATES PATENT OFFICE 2,141,930

RECEPTACLE FOR CONTAINING GLASS DURING ITS MANUFACTURE

John Henry Partridge, Middlesex, England, assignor to General Electric Company, a corporation of New York Application May 11, 1936, Serial No. 79,139
In Great Britain May 15, 1935

4 Claims. (Cl. 49—53)

This invention relates to receptacles for containing glass during its manufacture. Such receptacles will be called pots, but nothing is thereby implied as to their size or shape.

It is well known that certain very valuable glasses are so corrosive that there is grave difficulty in finding suitable materials for the pots in which they are melted. The difficulty is particularly acute when it is important that the glass should not be contaminated by material (e. g., mainly iron, but sometimes silica) contained in the refractories usually employed for pots. Thus, the glasses used for the envelopes of sodium vapor lamps are highly corrosive, and yet their iron content must be kept below about 0.02%. Materials are known that are not attacked by even these corrosive glasses or at least do not contaminate them when attacked. But they are either very expensive (e. g., platinum) or mechanically unsuitable (e. g., alumina or certain known aluminous porcelains).

The object of the invention is to overcome this difficulty and to provide pots that are cheap and mechanically strong, and yet are either not attacked by these corrosive glasses or, if they are attacked, do not contaminate them.

Certain materials that are cheap and chemically suitable (such as the aluminous porcelains aforementioned) can readily be formed into shells by the known process of slip-casting. But the shells so produced are not suitable for use as pots by themselves; for they are mechanically weak. This objection can be overcome by supporting the shells in pots of ordinary refractory material that is chemically unsuitable.

According to the invention a pot for containing glass during its manufacture comprises an inner shell formed by slip-casting a material that does not contaminate the glass melted in it, and an outer casing, supporting the said shell, formed of material that would contaminate the glass if it were melted in contact with it. The outer casing may support the inner shell directly; but preferably a layer of powdered material, for example, calcined alumina is placed between the two. Among materials suitable for the inner shell, when the glass is a sodium-vapor resisting glass, are aluminous porcelains made by slip-casting a mixture approximating to the following composition:—

| | Parts by weight |
|---|---|
| China clay | 6000 |
| Alumina | 2000 |
| Feldspar | 500 |
| Sodium silicate | 14 |
| Sodium carbonate | 4 |
| Water | 6000 |

Two embodiments of the invention will now be described by way of example with reference to Figures 1 and 2 of the accompanying drawing, each of which shows a sectional elevation of a pot.

In both figures, 1 is the outer casing, 2 the inner shell, 3 a layer of calcined alumina between the casing and shell.

In Figure 1, the pot is open and the shell is geometrically similar to the casing. In Figure 2, the pot has a lid 4 of the well-known form, which forms part of the casing, and the shell is geometrically similar to the part of the casing below the lid.

The slip-cast shell is composed of the aluminous porcelain described above and its wall is about 10 mm. thick. The casing is made in the ordinary way from an ordinary refractory clay. The layer 3 is about 25 mm. thick.

The materials from which the glass is to be made are then placed within the pot and founded in a furnace in the usual way. If the glass is one for the envelope of a sodium vapor lamp the material may consist of the following mixture:—

Silica, from 20 to 25 per cent (e. g., 21.5 per cent).
Alumina, from 20 to 25 per cent (e. g., 22.0 per cent).
Calcium oxide, from 9 to 11 per cent (e. g., 10.0 per cent).
Boric oxide, from 35 to 45 per cent (e. g., 40.0 per cent).
Sodium oxide, from 5 to 8 per cent (e. g., 6.0 per cent).
Potassium oxide, from 0 to 5 per cent (e. g., 0.5 per cent).

The glass resulting from founding this mixture will not greatly corrode the inner shell; and even if it corrodes it slightly there will be no objectionable contamination. Even if the shell breaks, the glass will come into contact with the alumina, by which it will not be contaminated, and not with the refractory clay.

What I claim as new and desire to secure by Letters Patent of the United States, is:—

1. A receptacle adapted for containing glass during its manufacture, said receptacle comprising an inner shell of porcelain and an outer casing of refractory material spaced apart from the inner shell, said procelain being practically free from substances that are contaminants of glass made in said receptacle and in its unfired state comprising China clay, alumina and feldspar in the approximate ratio, by weight, of 6000 parts China clay to 2000 parts alumina and 500 parts feldspar.

2. A receptacle adapted for containing glass during its manufacture comprising an inner shell of aluminous porcelain practically free from substances that are contaminants of glass used as an envelope in sodium vapor lamps, an outer casing of mechanically strong refractory clay and an intervening layer of calcined alumina powder between the said shell and the said casing.

3. A receptacle adapted for containing glass during its manufacture consisting of an inner shell of slip-cast porcelain practically free from iron and compounds thereof, an outer casing of mechanically strong refractory clay, and an intervening layer of calcined alumina powder between the said shell and the said casing.

4. A receptacle adapted for containing glass during its manufacture comprising an outer casing of mechanically strong refractory clay, an inner shell of slip-cast porcelain which in its unfired state comprises a mixture of China clay, alumina and feldspar in the approximate ratio by weight of 6000 parts of China clay to 2000 parts of alumina and 500 parts of feldspar, said mixture being practically free from substances that are contaminants of glass melted in said receptacle, and an intervening layer of calcined alumina powder between the said shell and the said casing.

JOHN HENRY PARTRIDGE.